(12) United States Patent
Hannuksela et al.

(10) Patent No.: US 9,319,717 B2
(45) Date of Patent: Apr. 19, 2016

(54) SYSTEM AND METHOD FOR PROVIDING AND USING PREDETERMINED SIGNALING OF INTEROPERABILITY POINTS FOR TRANSCODED MEDIA STREAMS

(75) Inventors: Miska Hannuksela, Ruutana (FI); Ye-Kui Wang, Tampere (FI)

(73) Assignee: Nokia Technologies Oy, Espoo (FI)

( * ) Notice: Subject to any disclaimer, the term of this patent is extended or adjusted under 35 U.S.C. 154(b) by 1326 days.

(21) Appl. No.: 11/971,176

(22) Filed: Jan. 8, 2008

(65) Prior Publication Data

US 2008/0175325 A1  Jul. 24, 2008

Related U.S. Application Data

(60) Provisional application No. 60/883,989, filed on Jan. 8, 2007.

(51) Int. Cl.
*H04N 21/222* (2011.01)
*H04N 21/2343* (2011.01)
(Continued)

(52) U.S. Cl.
CPC ............. *H04N 21/222* (2013.01); *H04N 19/30* (2014.11); *H04N 19/40* (2014.11); *H04N 19/46* (2014.11); *H04N 19/70* (2014.11); *H04N 21/2353* (2013.01); *H04N 21/23439* (2013.01); *H04N 21/234309* (2013.01); *H04N 21/24* (2013.01); *H04N 21/25833* (2013.01); *H04N 21/2662* (2013.01)

(58) Field of Classification Search
CPC .................................................. H04N 21/222
USPC ..................................................... 375/240.26
See application file for complete search history.

(56) References Cited

U.S. PATENT DOCUMENTS 6,490,320 B1    12/2002  Vetro et al.
2003/0233612 A1*  12/2003  Gilchrist et al. ............ 714/776
(Continued)

FOREIGN PATENT DOCUMENTS

| WO | WO 03041396 | 5/2003 |
|---|---|---|
| WO | 2005112464 | 11/2005 |
| WO | WO 2006/058921 | 6/2006 |
| WO | 2006108917 | 10/2006 |

OTHER PUBLICATIONS

Wikipedia. "H.262/MPEG-2 Part 2". <http://en.wikipedia.org/wiki/H.262/MPEG-2_Part_2#Video_profiles_and_levels>. Mar. 27, 2015.*

(Continued)

*Primary Examiner* — Hassan Kizou
*Assistant Examiner* — Ashil Farahmand
(74) *Attorney, Agent, or Firm* — Banner & Witcoff, Ltd.

(57) ABSTRACT

A system and method for identifying when an indicated or predetermined media transcoding process results in a media stream that is compliant with an indicated interoperability point. Various embodiments allow for the encoding, storage, transcoding, and transmission of a media stream, for which a transcoding process is identified and the resulting media stream of the transcoding process is associated with at least one property. The signaling of the property or properties, and an identification of the transcoding process in one embodiment, may be included in the media bitstream, in a file format container containing the media bitstream, or in a transmission or control protocol for transmission or control of the media bitstream.

20 Claims, 5 Drawing Sheets

(51) Int. Cl.
*H04N 21/235* (2011.01)
*H04N 21/24* (2011.01)
*H04N 21/258* (2011.01)
*H04N 21/2662* (2011.01)
*H04N 19/70* (2014.01)
*H04N 19/46* (2014.01)
*H04N 19/30* (2014.01)
*H04N 19/40* (2014.01)

(56) References Cited

U.S. PATENT DOCUMENTS

| | | | |
|---|---|---|---|
| 2005/0201461 A1 | 9/2005 | Suzuki et al. | |
| 2005/0254575 A1* | 11/2005 | Hannuksela et al. | 375/240.1 |
| 2007/0230568 A1* | 10/2007 | Eleftheriadis et al. | 375/240.1 |
| 2008/0175325 A1* | 7/2008 | Hannuksela et al. | 375/240.26 |

OTHER PUBLICATIONS

Kuhn et al., MPEG-7 Transcoding hints for reduced complexity and improved quality. SONY Corporation, Information and Network Technologies Laboratories, Tokyo, Japan. Presented at the International Packet Video Workshop 2001, Kyongju, Korea. Retrieved from the internet: http://citeseer.ist.psu.edu/kuhn01mpeg.html.

International Search report for PCT Patent Application No. PCT/IB2008/050023.

Notification of the Second Office Action in CN200880018667 dated Jan. 11, 2012 with English Translation.

Supplementary European Search Report for EP 08700204 dated Aug. 21, 2012.

Segall, "Support for Transcodiing in the Scalability Information SEI", 22. JVT Meeting; 79. MPEG Meeting; Jan. 13, 2007-Jan. 20, 2007; No. JVT-V036, Jan. 19, 2007.

Segall, "Support for Transcoding in the Scalability Information SEI", 21. JVT Meeting; 78. MPEG Meeting; Oct. 20, 2006-Oct. 27, 2006; Hangzhou, CN, No. JVT-U044, Oct. 22, 2006.

Wang, "Scalability Information SEI for SVC", JVT-O012, 15th Meeting: Busan, Korea, Apr. 16-22, 2005, 10 pages.

Office Action in EP08700204.4 dated Feb. 27, 2014.

Non-Final Rejection in Korean Application No. 10-2009-7014060 dated Dec. 13, 2010, with English translation.

First Examination Report in IN 3741/CHENP/2009 dated Oct. 8, 2014.

* cited by examiner

SYSTEM AND METHOD FOR PROVIDING AND USING PREDETERMINED SIGNALING OF INTEROPERABILITY POINTS FOR TRANSCODED MEDIA STREAMS

CROSS-REFERENCE TO RELATED APPLICATIONS

The present application claims priority to U.S. Provisional Patent Application No. 60/883,989, filed Jan. 8, 2007.

FIELD OF THE INVENTION

The present invention relates generally to the transcoding of data from one format to another. More particularly, the present invention relates to the identification of a target transcoding format and the indication of the corresponding interoperability point of the target transcoded bitstream so as to permit a converting device to determine whether the desired transcoding would result in a usable media stream.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Multimedia applications include local playback, streaming or on-demand, conversational and broadcast/multicast services. Interoperability (IOP) among these services is important for the fast deployment and large-scale market formation of each multimedia application. To achieve high IOP, different standards are specified.

Typical audio and video coding standards specify profiles and levels. A profile is a subset of algorithmic features of the standard. A level is a set of limits to the coding parameters that impose a set of constraints in decoder resource consumption. The profile and level can be used to signal properties of a media stream, as well as to signal the capability of a media decoder. Each pair of profile and level forms an "interoperability point."

Through the combination of a profile and a level, a decoder can declare, without actually attempting the decoding process, whether it is capable of decoding a stream. If the decoder is not capable of decoding the stream, it may cause the decoder to crash, operate slower than real-time, and/or discard data due to buffer overflows.

Technologies involved in multimedia applications include, among others, media coding, storage and transmission. Media types include speech, audio, image, video, graphics, time text, etc. Although the description contained herein is applicable to all media types, video is described herein as an example.

Different standards have been specified for different technologies. Video coding standards include the ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 Advanced Video Coding (AVC) or, in short, H.264/AVC). In addition, there are currently efforts underway to develop new video coding standards. One such standard under development is the scalable video coding (SVC) standard, which will become the scalable extension to the H.264/AVC standard. Another such standard under development is the multi-view video coding (MVC) standard, which will become another extension to the H.264/AVC standard. The latest draft of the SVC standard, the Joint Draft 8.0, is available in JVT-U201, "Joint Draft 8 of SVC Amendment", 21st JVT meeting, HangZhou, China, October 2006. The latest joint draft of the MVC standard is available in JVT-U209, "Joint Draft 1.0 on Multiview Video Coding", 21st JVT meeting, HangZhou, China, October 2006. The latest draft of video model of the MVC standard is described in JVT-U207, "Joint Multiview Video Model (JMVM) 2.0", 21st JVT meeting, HangZhou, China, October 2006. The content of all of these documents are incorporated herein by reference in their entireties.

Scalable media is typically ordered into hierarchical layers of data. A base layer contains an individual representation of a coded media stream such as a video sequence. Enhancement layers contain refinement data relative to previous layers in the layer hierarchy. The quality of the decoded media stream progressively improves as enhancement layers are added to the base layer. An enhancement layer enhances the temporal resolution (i.e., the frame rate), the spatial resolution, or simply the quality of the video content represented by another layer or part thereof. Each layer, together with all of its dependent layers, is one representation of the video signal at a certain spatial resolution, temporal resolution and quality level. Therefore, the term "scalable layer representation" is used herein to describe a scalable layer together with all of its dependent layers. The portion of a scalable bitstream corresponding to a scalable layer representation can be extracted and decoded to produce a representation of the original signal at certain fidelity.

An encoded bitstream according to H.264/AVC or its extensions, e.g. SVC and MVC, is either a NAL unit stream, or a byte stream by prefixing a start code to each NAL unit in a NAL unit stream. A NAL unit stream is simply a concatenation of a number of NAL units. A NAL unit is comprised of a NAL unit header and a NAL unit payload. The NAL unit header contains, among other items, the NAL unit type indicating whether the NAL unit contains a coded slice, a coded slice data partition, a sequence or picture parameter set, and so on. The video coding layer (VCL) contains the signal processing functionality of the codec; mechanisms such as transform, quantization, motion-compensated prediction, loop filter, inter-layer prediction. A coded picture of a base or enhancement layer consists of one or more slices. The NAL encapsulates each slice generated by the video coding layer (VCL) into one or more NAL units.

Coded video bitstreams may include extra information to enhance the use of the video for a wide variety purposes. For example, supplemental enhancement information (SEI) and video usability information (VUI), as defined in H264/AVC, provide such a functionality. The H.264/AVC standard and its extensions include the support of supplemental enhancement information (SEI) signaling through SEI messages. SEI messages are not required by the decoding process to generate correct sample values in output pictures. Rather, they are helpful for other purposes, e.g., error resilience and display. H.264/AVC contains the syntax and semantics for the specified SEI messages, but no process for handling the messages in the recipient is defined. Consequently, encoders are required to follow the H.264/AVC standard when they create SEI messages, and decoders conforming to the H.264/AVC standard are not required to process SEI messages for output order conformance. One of the reasons to include the syntax and semantics of SEI messages in H.264/AVC is to allow system specifications, such as 3GPP multimedia specifications and DVB specifications, to interpret the supplemental information identically and hence interoperate. It is intended that system specifications can require the use of particular SEI messages both in encoding end and in decoding end, and the process for handling SEI messages in the recipient may be specified for the application in a system specification.

Available media file format standards include ISO file format (ISO/IEC 14496-12), MPEG-4 file format (ISO/IEC 14496-14), AVC file format (ISO/IEC 14496-15) and 3GPP file format (3GPP TS 26.244). The SVC file format, the file format standard for storage of SVC video, is currently under development, as an extension to the AVC file format. The latest SVC file format draft is available in MPEG document N8663.

3GPP TS 26.140 specifies the media types, formats and codecs for the multimedia messaging services (MMS) within the 3GPP system. 3GPP TS 26.234 specifies the protocols and codecs for the packet-switched streaming services (PSS) within the 3GPP system. The ongoing 3GPP TS 26.346 specifies the protocols and codecs for multimedia broadcast/multicast services (MBMS) within the 3GPP system.

Available video coding standards specify buffering models and buffering parameters for the bitstreams. Such buffering models are referred to as Hypothetical Reference Decoder (HRD) or Video Buffer Verifier (VBV). A standard compliant bitstream must comply with the buffering model with a set of buffering parameters specified in the corresponding standard. Such buffering parameters for a bitstream may be explicitly or implicitly signaled. "Implicitly signaled" means that the default buffering parameter values according to the profile and level apply. The HRD/VBV parameters are primarily used to impose constraints on the bit rate variations of compliant bitstreams.

United States Application Publication No. 2005/0254575, filed May 12, 2004 and incorporated by reference herein in its entirety, describes a process for the signaling of multiple operation points for scalable media streams. According to the process described in this publication, an operation point, such as any subset of profile, level, and HRD/VBV parameters, can be associated with any valid subset of layers of the scalable media stream. Profile and level information, among others, for scalable layers is included in the scalability information supplemental enhancement information (SEI) message of the SVC specification (JVT-U201, the contents of which are incorporated herein by reference in its entirety).

For a scalable bitstream, each scalable layer, together with the layers on which the scalable layer depends, can be extracted as a subset of the scalable bitstream. Transcoding, as defined as follows, is not needed to extract a scalable layer and its dependent layers. At least part of the coded media stream resulting from the transcoding process is not a subset of the original coded media stream input to the transcoding process. Extraction of a scalable media stream is not classified as transcoding, as the resulting stream from the truncation process is a subset of the original stream.

The following is a discussion of a number of representative transcoding use cases. One function of media-aware network elements (MANEs) is to ensure that the recipient of the media contents is capable of decoding and presentation of the media contents. MANEs include devices such as gateways, multipoint conference units (MCUs), Real-Time Transport Protocol (RTP) translators, RTP mixers, multimedia messaging centers (MMSCs), push-to-talk over cellular (PoC) servers, Internet Protocol (IP) encapsulators in digital video broadcasting-handheld (DVB-H) systems, or set-top boxes that forward broadcast transmissions locally to home wireless networks, for example. In order to guarantee successful decoding and presentation, a MANE may have to convert the input media stream to a format that complies with the capabilities of the recipient. Transcoding the media stream is one way of converting the media stream. In another situation, because a device may not be capable of decoding an input media stream in real-time, the input media stream is transcoded more slowly than real-time, e.g. as a background operation. The transcoded stream can then be decoded and played in real-time.

The coding format for a media stream (coding format A, e.g. a scalable bitstream) can be transcoded to another coding format (coding format B, e.g. a non-scalable bitstream). Coding format B may be preferable in some environments due to a larger number of devices supporting coding format B compared to the number of devices supporting coding format A. Hence, transcoding of coding format A to coding format B may be carried out in the originator or sender of the media stream of coding format A. For example, a bitstream coded with SVC can be transcoded to a plain H.264/AVC bitstream. The number of H.264/AVC devices exceeds the number of SVC devices. Therefore, in some applications, the transcoding of SVC streams to H.264/AVC may be preferred to support a larger number of receiver devices.

A straightforward, yet also highly computationally intensive transcoding method involves fully decoding the bitstream and then re-encode the decoded sequence. There are also many transcoding technologies that operate in the transform domain instead of in the pixel domain as the most straightforward method. Video transcoding technologies are discussed in detail in A. Vetro, C. Christopoulos, and H. Sun, "Video Transcoding Architectures and Techniques: An Overview," IEEE Signal Processing Magazine, vol. 20, no. 2, pp. 18-29, March 2003, the contents of which are incorporated herein by reference in its entirety.

In addition to more traditional transcoding technologies, some lightweight transcoding of SVC or MVC bitstreams to H.264/AVC bitstreams is possible, due to the fact that SVC and MVC are H.264/AVC extensions, and many of the coding tools, are similar. One example of the lightweight transcoding of a SVC bitstream, with certain restrictions, to a H.264/AVC bitstream has been shown in JVT-U043, the contents of which are incorporated herein by reference. This method is referred to as the first lightweight transcoding method.

Another example of lightweight transcoding is described as follows. The base layer of SVC streams can be decoded by H.264/AVC decoders when the enhancement layers are also feed to the H.264/AVC decoders. This is achieved by using such Network Abstraction Layer (NAL) unit types that are reserved in the H.264/AVC standard and therefore are ignored by H.264/AVC decoders for SVC enhancement layer data. SVC streams can sometimes contain more than one independently coded layer, i.e. a layer that is not inter-layer predicted from any other layer. However, only one of these layers can be coded as a H.264/AVC compatible base layer in order to maintain the backward compatibility of the SVC standard with the H.264/AVC standard and decoders. The latest SVC design permits an independent SVC layer to be converted to a H.264/AVC bitstream with modifications to the NAL unit header only. The modifications comprise removing the SVC NAL unit header extension bytes and changing the value of the syntax element nal_unit_type as follows. If the original nal_unit_type value is equal to 20, then it is changed to 1. If the original nal_unit_type value is equal to 21, then it is changed to 5. This method is referred to as the second lightweight transcoding method.

For both of the above lightweight transcoding methods, the parameter sets (both sequence parameter sets (SPSs) and picture parameter sets (PSSs)) that are not referred to by the target layer and the required lower layers that have been transcoded should be discarded, while the SPSs that are referred to by the target layer and the required lower layers must be changed accordingly. For example, the profile and level information (i.e. the beginning third bytes in the SPS) must be changed to contain the corresponding information of the transcoded bitstream, and the SPS SVC extension (seq_parameter_set_svc_extension( )), if present, must be removed. In addition, if there are SEI messages that are contained in scalable nesting SEI messages in the original SVC bitstream for the target layer, those SEI messages must then appear in the transcoded bitstream in their original forms, i.e., not contained in scalable nesting SEI messages. For the first lightweight transcoding, modifications to the NAL unit header (the same as for the second lightweight transcoding method) and the slice header are also required.

Like in the case of SVC, the base view of any MVC stream is compatible with the H.264/AVC standard and can be decoded with H.264/AVC decoders, as MVC NAL units use only those NAL unit types that were reserved in the H.264/AVC standard. However, there might be multiple independent views, i.e. views that are not inter-view predicted from any other view, in a single MVC stream. These independent views could be converted to an H.264/AVC stream with modifications to the NAL unit header only. It is noted that the independent MVC views may also be compliant with SVC other than H.264/AVC.

Currently, it cannot be determined whether a media stream is encoded in such a manner that, when it is transcoded by a certain transcoding process, the resulting bitstream complies with a certain interoperability point. Currently, the only system for determining the interoperability point for a transcoded stream has been to run the transcoded stream through a stream verifier, such as HRD/VBV, returning the interoperability point of the stream. This is computationally costly and requires the presence of a verifier coupled with a transcoder. For lightweight transcoding methods and some other low-complexity transcoding methods, e.g. some transform-domain methods, the complexity of the transcoder itself would be much lower than the verifier. Furthermore, when a recipient has requested for a stream conforming to a certain interoperability point, transcoding and transmission of the transcoded stream may not be performed simultaneously if the additional stream verifier is running at the same time.

Joint Video Team document JVT-U044 (incorporated herein by reference in its entirety) proposes an addition to the scalability information SEI message signaling the average and maximum bitrates resulting from a transcoding operation. However, these pieces of information are not sufficient for a decoder implementation to determine whether it can decode the transcoded stream in real-time.

There is therefore a need of an improved system and method of signaling the IOP information of the transcoded bitstreams for low-complexity transcoding methods.

SUMMARY OF THE INVENTION

Various embodiments of the present invention provide a system and method for identifying where an indicated or predetermined media transcoding process results in a media stream that is compliant with an indicated interoperability point, such as a profile and level specified for the media coding format. The various embodiments allow for the encoding, storage, transcoding, and transmission of a media stream, for which a transcoding process is identified and the resulting media stream of the transcoding process is associated with at least one property. The property or properties may include, for example, the profile, level and a set of at least one HRD/VBV parameter. The signaling of the property or properties, as well as an identification of the transcoding process, may be included in the media bitstream, in a file format container containing the media bitstream, or in a transmission or control protocol for transmission or control of the media bitstream. This information may be used by a converter to determine whether the desired transcoding would result in a usable media stream. With the various embodiments of the present invention, a server or a gateway does not need to analyze the coding format, profile, level and HRD/VBV parameters of the resulting stream from the transcoding process by verifying the resulting stream. This thereby reduces the computational complexity and avoids the need for a HRD/VBV verifier in the server or the gateway.

Various embodiments generally provide a method, computer program product and apparatus for providing an encoded media stream with transcoding information, comprising: encoding a video sequence into a media stream; identifying a transcoding process that, when applied to the media stream after encoding, results in a desired transcoded media stream; and signaling a coding property characterizing the transcoded media stream. Various embodiments also generally provide a method, computer program product and apparatus for converting an input media stream into a desired output media stream; comprising identifying a first coding property characterizing a desired transcoded media stream; identifying a second coding property characterizing the desired output media stream; identifying a transcoding process for use in creating the transcoded media stream; if the first coding property complies with the second coding property, converting the input media stream in accordance with the identified transcoding process; and outputting the transcoded media stream.

Various embodiments provide for a method, computer program product and encoding apparatus for providing an encoded media stream with transcoding information. In these embodiments, a video sequence is encoded into a scalable encoded bitstream comprising a plurality of layers. Signaling corresponding to a layer of the plurality of layers is also provided. The signaling includes information identifying a transcoding process that, when applied to the layer after encoding, results in a desired transcoded media stream and a coding property characterizing the transcoded media stream.

Various embodiments also provide for a method, computer program product and converting apparatus for converting an input media stream into a desired output media stream. First and second coding properties characterizing a desired transcoded media stream are identified. Provided signaling corresponding to one of a plurality of layers of a scalable encoded bitstream is used to identify a transcoding process for use in creating the transcoded media stream. If the first coding property complies with the second coding property, the input media stream is converted in accordance with the identified transcoding process, and the transcoded media stream is then output.

Various embodiments also provide for a data structure, associated with a media stream and embodied in a computer-readable medium. The data structure comprises at least one syntax element associated with a transcoding process and a coding property characterizing a transcoded media stream resulting when the transcoding process is applied to the one of a plurality of layers of a scalable encoded bitstream. A method of storing a media stream is also provided, comprising analyzing the media stream to identify a coding property characterizing a transcoded media stream according to a desired transcoding process; and storing the coding property in a file format container in accordance with a file format specification. Various embodiments also provide a method for creating a bitstream with transcoding information contained therein. The method includes analyzing a first bitstream, identifying a desired transcoding process for the first bitstream and a coding property of the desired transcoding process, and including a signaling of the coding property within the first bitstream, thereby generating a second bitstream.

Although various embodiments of the present invention are described herein in terms of video coding and to the H.264/AVC standard and its extensions, the present invention is equally applicable to any other media type and coding format. The present invention is also applicable to multimedia presentations involving more than one media type or coding format.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Figure 1:
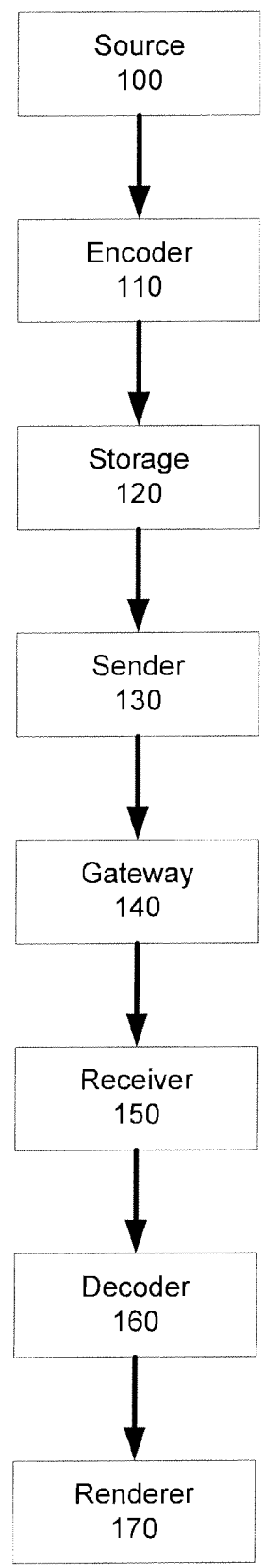
FIG. 1 is a representation of a generic multimedia communications system for use with the present invention.

FIG. 1 shows a generic multimedia communications system for use with the present invention. A data source 100 provides a source signal in an analog, uncompressed digital, or compressed digital format, or any combination of these formats. An encoder 110 encodes the source signal into a coded media bitstream. The encoder 110 may be capable of encoding more than one media type, such as audio and video, or more than one encoder 110 may be required to code different media types of the source signal. The encoder 110 may also receive synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the following only one encoder 110 is considered to simplify the description without a lack of generality.

The coded media bitstream is transferred to a storage 120. The storage 120 may comprise any type of mass memory to store the coded media bitstream. The format of the coded media bitstream in the storage 120 may be an elementary self-contained bitstream format, or one or more coded media bitstreams may be encapsulated into a container file. Some systems operate "live", i.e. omit storage and transfer coded media bitstream from the encoder 110 directly to the sender 130. The coded media bitstream is then transferred to the sender 130, also referred to as the server, on a need basis. The format used in the transmission may be an elementary self-contained bitstream format, a packet stream format, or one or more coded media bitstreams may be encapsulated into a container file. The encoder 110, the storage 120, and the server 130 may reside in the same physical device or they may be included in separate devices. The encoder 110 and server 130 may operate with live real-time content, in which case the coded media bitstream is typically not stored permanently, but rather buffered for small periods of time in the content encoder 110 and/or in the server 130 to smooth out variations in processing delay, transfer delay, and coded media bitrate.

The server 130 sends the coded media bitstream using a communication protocol stack. The stack may include but is not limited to Real-Time Transport Protocol (RTP), User Datagram Protocol (UDP), and Internet Protocol (IP). When the communication protocol stack is packet-oriented, the server 130 encapsulates the coded media bitstream into packets. For example, when RTP is used, the server 130 encapsulates the coded media bitstream into RTP packets according to an RTP payload format. Typically, each media type has a dedicated RTP payload format. It should be again noted that a system may contain more than one server 130, but for the sake of simplicity, the following description only considers one server 130.

The server 130 may or may not be connected to a gateway 140 through a communication network. The gateway 140 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways 140 include multipoint conference control units (MCUs), gateways between circuit-switched and packet-switched video telephony, Push-to-talk over Cellular (PoC) servers, IP encapsulators in digital video broadcasting-handheld (DVB-H) systems, or set-top boxes that forward broadcast transmissions locally to home wireless networks. When RTP is used, the gateway 140 is called an RTP mixer or an RTP translator and typically acts as an endpoint of an RTP connection.

The system includes one or more receivers 150, typically capable of receiving, de-modulating, and de-capsulating the transmitted signal into a coded media bitstream. The codec media bitstream is typically processed further by a decoder 160, whose output is one or more uncompressed media streams. It should be noted that the bitstream to be decoded can be received from a remote device located within virtually any type of network. Additionally, the bitstream can be received from local hardware or software. Finally, a renderer 170 may reproduce the uncompressed media streams with a loudspeaker or a display, for example. The receiver 150, decoder 160, and renderer 170 may reside in the same physical device or they may be included in separate devices.

Various embodiments of the present invention provide a system and method for identifying where an indicated or predetermined media transcoding process results in a media stream that is compliant with an indicated interoperability point, such as a profile and level specified for the media coding format. The various embodiments allow for the encoding, storage, transcoding, and transmission of a media stream, for which a transcoding process is identified and the resulting media stream of the transcoding process is associated with at least one property. The property or properties may include, for example, the profile, level and a set of at least one HRD/VBV parameter. The signaling of the property or properties, as well as an identification of the transcoding process, may be included in the media bitstream, in a file format container containing the media bitstream, or in a transmission or control protocol for transmission or control of the media bitstream. This information may be used by a converter to determine whether the desired transcoding would result in a usable media stream. With the various embodiments of the present invention, a server or a gateway does not need to analyze the coding format, profile, level and HRD/VBV parameters of the resulting stream from the transcoding process by verifying the resulting stream. This thereby reduces the computational complexity and avoids the need for a HRD/VBV verifier in the server or the gateway.

It should be understood that, although text and examples contained herein may specifically describe an encoding process, one skilled in the art would readily understand that the same concepts and principles also apply to the corresponding decoding process and vice versa. The following is an example implementation of various embodiments of the present invention, related specifically to multimedia messaging.

A multimedia message is created for which the bitstream complies, for example, with SVC, Level 1.1. The base layer of the SVC bitstreams is compliant with the H.264/AVC Baseline Profile, Level 1. The bitstream can be transcoded into an H.264/AVC bitstream with a transcoding method similar to the method described in JVT-U043. At the time of creation, the originating terminal does not know the capability of the receiving terminals. A Multimedia Messaging Service Center (MMSC), in contrast, knows the capability of the receiving terminals and is responsible of adapting the message accordingly when needed. In this example, a first receiving terminal is capable of decoding H.264/AVC Baseline Profile, Level 1.1 bitstreams, while a second receiving terminal is capable of decoding H.264/AVC Baseline Profile, Level 1.0 bitstreams. Consequently, adaptation is needed for the first receiving terminal, while the base layer can be directly extracted for the second device.

The adaptation process using an embodiment of the present invention requires that the indicated lightweight transcoding process transcode the SVC stream into an H.264/AVC bitstream of H.264/AVC Baseline Profile, Level 1.1. Without the embodiments of the present invention, a MMSC cannot know for sure whether the SVC bitstream can be transcoded to H.264/AVC format with the lightweight transcoding process and whether the transcoded bitstream complies with the target profile and level. The MMSC would therefore have to run an analysis process, e.g., a hypothetical reference decoder, for the transcoded stream to make the determination. Thus, the embodiments of the present invention save computations in the MMSC and implementation of the analysis function can be avoided. Without the invention and if the MMSC does not implement the analysis function, the above service for the first receiving device is impossible. In this case, the base layer may have been coded to comply with H.264/AVC Baseline Profile, Level 1, providing a poorer quality compared to the transcoded stream. Hence, the implementation improves the achievable quality compared to the situation when H.264/AVC compatible base layer is transmitted as such.

A second example implementation is similar to the first example above. However, this example demonstrates the use of an embodiment of the present invention in terms of multi-party video conferencing. In this example, it is assumed that a first participant (the first sender) sends SVC Level 1.1 bitstream to the MCU, and two other participants (the first receiver and the second receiver) would like to view the view from the first participant. The first receiver is capable of decoding H.264/AVC Baseline Profile, Level 1.1 bitstreams, while a second receiving terminal is capable of decoding H.264/AVC Baseline Profile, Level 1.0 bitstreams. Therefore, according to this embodiment of the present invention, the MCU can utilize an identified lightweight transcoding process to transcode the SVC bitstream to an H.264/AVC bistream of a signaled IOP point, i.e., H.264/AVC Baseline Profile, Level 1.1, for the first receiving device, without having to implement or run an analysis process.

Figure 2:
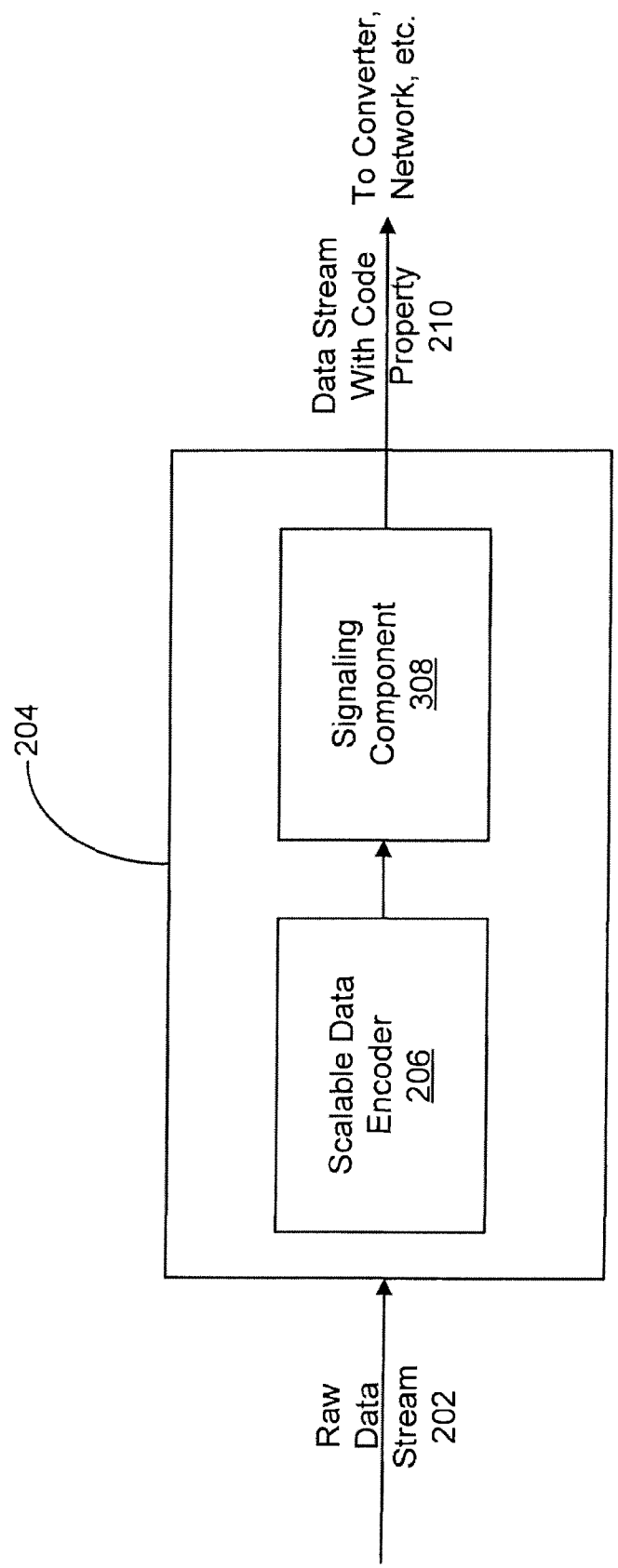
FIG. 2 is a diagram illustrating an encoding device in an exemplary embodiment of the present invention.

FIG. 2 is a diagram illustrating an encoding device 304 in an exemplary embodiment of the present invention. As shown in FIG. 2, an encoding device 204 receives a raw data stream 202. A scalable data encoder 206 identifies a transcoding process that results in a transcoded media stream when applied to the encoded media stream. The raw data stream 202 is encoded and one or more layers are produced by the scalable data encoder 206 of the encoder 204. The layers produced by the scalable data encoder 206 are then signaled by the signaling component 208, which signals a coding property characterizing the transcoded media stream and an identification of the transcoding process if a layer and the required lower layers are transcoded according to the identified transcoded process. The signaling, for both the coding property of the transcoded bitstream and the transcoding process identification, may be performed within the media stream, within a file containing the media stream, or by a transport or control protocol. The coding property indicated in the data stream 210 is output from the encoding device 204, thus allowing a receiving device (MMSC or decoder) to read the signals in order to determine the whether the proper transcoding is possible. The coding property can comprise a coding format, profile, level, and/or at least one parameter of HRD/VBV.

Figure 3:
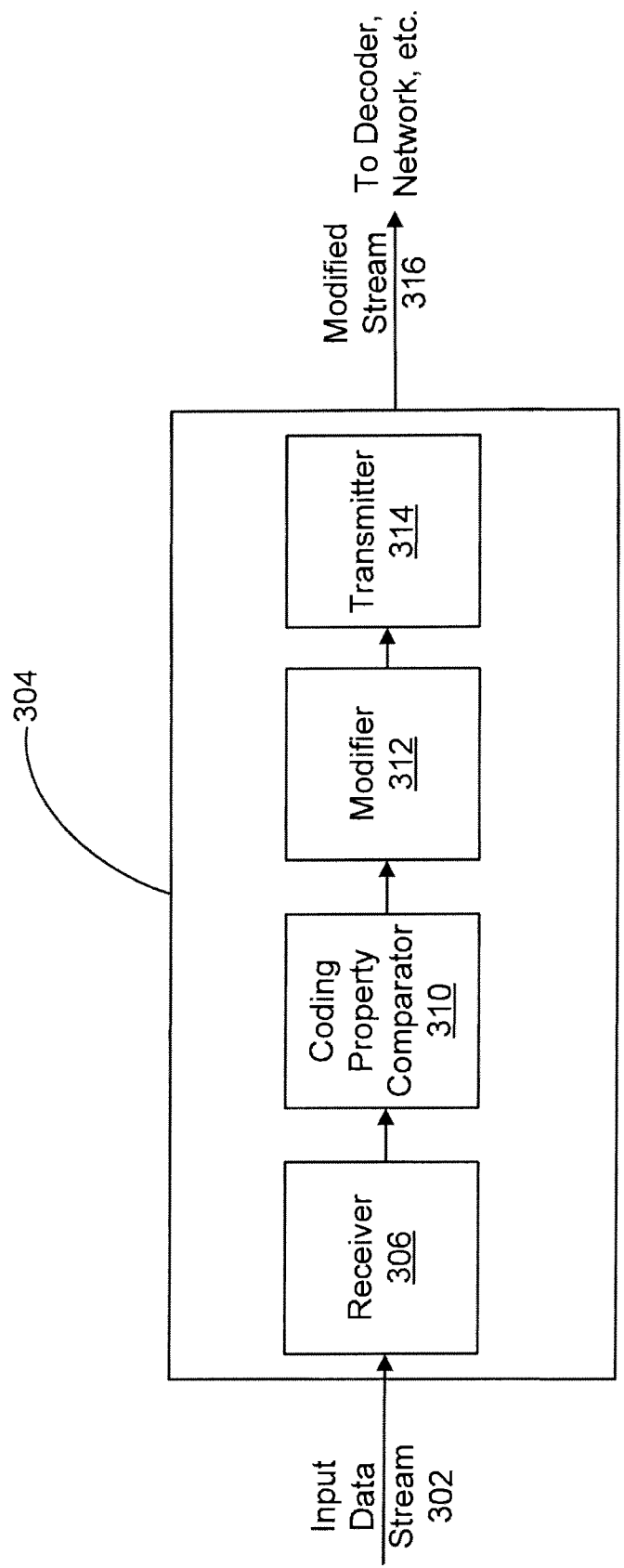
FIG. 3 is a diagram illustrating a converter device in an exemplary embodiment of the present invention.

FIG. 3 is a diagram illustrating a converter device 304 in an exemplary embodiment of the present invention. The converter device 304 is used to convert an input media stream 302 into a desired output media stream (shown as a modified media stream 316), such as a media stream according to a format that is decodable by a subsequent decoder. The converter device 304 may comprise, for example, a gateway, a MCU, a RTP translator, a RTP mixer, a MANE or a streaming server. Additionally, the converter device 304 may include a decoder integrated therein.

The input media stream 302 is received at a receiver 306. The input media stream 302 is associated with signaling of a coding property identifies a desired transcoded media stream (once the input media stream 302 has been converted). The coding property can comprise a coding format, profile, level, and/or at least one parameter of HRD/VBV. In addition to the input media stream 302 and the coding property for the desired transcoded media stream, an identification of the desired transcoding process is also received. All of this information can be stored for later transcoding and/or use if so desired.

Inside the converter device 304, at least one coding property for the desired output media stream is determined. At a coding property comparator 310, it is determined whether the coding property characterizing the transcoded media stream complies with the coding property characterizing the desired output media stream. For example, this determination can involve determining, if transcoding occurs according to the signaling received with the input media stream 302, whether the decoder would be capable of decoding the resulting stream. If the coding property characterizing the transcoded media stream complies with the coding property characterizing the desired output media stream (e.g. if the coding property includes profile and level information, and all of the profile and level information is identical for both the transcoded media stream and desired output media stream), then the scalable input media stream 302 is modified by the media stream modifier 312 according to the identified transcoding process. The modified data stream is then transmitted by transmitter 314. The modified data stream 316 is output from the converter 304 destined for a receiving device (MMSC or decoder). The modified data stream 316 can be processed and/or decoded in the conventional fashion.

The following is a depiction of example syntax and semantics which may be used in a successful implementation of the present invention. For SVC signaling in a bitstream, the syntax of the scalability information SEI message can be as follows. When present, this SEI message appears in an IDR access unit.

| scalability info( payloadSize ) { | C | Descriptor |
|---|---|---|
|    temporal_id_nesting_flag | 5 | u(1) |
|    num_layers_minus1 | 5 | ue(v) |
|    for( i = 0; i <= num_layers_minus1; i++ ) { | | |
|       layer_id[ i ] | 5 | u(8) |
|       ... /* same as in JVT-U201 */ | | |
|       exact_interlayer_pred_flag[ i ] | 5 | u(1) |
|       transcoding_info_present_flag[ i ] | 5 | u(1) |
|       ... /* same as in JVT-U201 */ | | |
|    } else | | |
|       init_parameter_sets_info_src_layer_id_delta[ i ] | 5 | ue(v) |
|    if( transcoding_info_present_flag[ i ] ) { | | |
|       num_transcoding_processes_minus1[ i ] | 5 | ue(v) |
|       for( j = 0; j <= num_transcoding_processes_minus1[ i ];j++ ) { | | |
|          trans_process_id[ i ][ j ] | 5 | ue(v) |
|          trans_profile_idc[ i ][ j ] | 5 | u(8) |
|          trans_constraint_set0_flag[ i ][ j ] | 5 | u(1) |
|          trans_constraint_set1_flag[ i ][ j ] | 5 | u(1) |
|          trans_constraint_set2_flag[ i ][ j ] | 5 | u(1) |
|          trans_constraint_set3_flag[ i ][ j ] | 5 | u(1) |
|          reserved_zero_4bits /* equal to 0 */ | 5 | u(4) |
|          trans_level_idc[ i ][ j ] | 5 | u(8) |
|       } | | |
|    } | | |
|    } | | |
| } | | |

In the above syntax, a transcoding_info_present_flag[i] equal to 1 indicates that transcoding information for the layer with layer identifier equal to layer_id[i] is signaled. A value of 0 indicates that no transcoding information for the layer with layer identifier equal to layer_id[i] is signaled.

num_transcoding_processes_minus1[i] plus 1 indicates the number of transcoding processes for which the transcoding process identifiers and the corresponding information of profile and level of the transcoded bitstreams are signaled. For each transcoding process, the transcoded bitstream is obtained by transcoding the bitstream of representation of the scalable layer with layer identifier equal to layer_id[i] according to the transcoding processes.

trans_process_id[i][j] indicates the transcoding process identifier of the j-th transcoding process signaled for the scalable layer with layer identifier equal to layer_id[i]. The transcoding processes are specified as follows, although additional transcoding processes could also be added.

| trans_process_id[i][j] | Transcoding Process |
|---|---|
| 0 | The first lightweight trancoding method discussed previously |
| 1 | The second lightweight trancoding method discussed previously, when the entropy coding method applied is the Context Adaptive Variable Length Coding (CAVLC) method, i.e., entropy_coding_mode_flag in the transcoding bitstream is equal to 0. |
| 2 | The second lightweight trancoding method discussed previously when the entropy coding method applied is the Context Adaptive Binary Arithmetic Coding (CABAC) method, i.e., entropy_coding_mode_flag in the transcoded bitstream is equal to 1. | trans_profile_idc[i][j], trans_constraint_set0_flag[i][j], trans_constraint_set1_flag[i][j], trans_constraint_set2_flag[i][j], trans_constraint_set3_flag[i][j], and trans_level_idc[i][j] indicate the profile and level compliancy of the resulting bitstream when the bitstream of the representation of scalable layer with layer identifier equal to layer_id[i] is transcoded according to the transcoding process with the transcoding process identifier equal to trans_process_id[i][j]. The semantics of trans_profile_idc[i], trans_constraint_set0_flag[i], trans_constraint_set1_flag[i], trans_constraint_set2_flag[i], trans_constraint_set3_flag[i], and trans_level_idc[i] are identical to the semantics of profile_idc, constraint_set0_flag, constraint_set1_flag, constraint_set2_flag, constraint_set3_flag and level_idc, respectively, with the bitstream in question being the transcoded bitstream.

In addition to the profile and level signaled above, other properties may also be similarly included in the scalability information SEI message. These properties include, but are not limited to, HRD/VBV parameters, bitrate information, frame rate information, initial parameter sets, Example signaling for an SVC file format is as follows. In this example, a new box, TranscodingInfoBox( ), is defined as follows and is optionally included in the ScalableTierEntry( ).

```
Box Types:      'tran'
Container:      ScalableTierEntry
Mandatory:      No
Quantity:       Zero or One
class TranscodingInfoBox extends Box ('tran') {
    unsigned int(8) transcoding_process_id_count;
    for (i=0; i< transcoding_process_id_count; i++)
            unsigned int(8) transcoding_process_id;
            unsigned int(8) trans_profileIndication;
            unsigned int(8) trans_profile_compatibility;
            unsigned int(8) trans_levelIndication;
}
class ScalableTierEntry( ) extends VisualSampleGroupEntry ('scif') {
    unsigned int(8) groupId;
    unsigned int(8) tierId;
    unsigned int(5) reserved = 0;
    unsigned int(1) is_tier_IDR;
    unsigned int(1) primary_definition;
    unsigned int(1) is_key_picture;
    unsigned int(8) reserved = 0;
    if (primary_definition ==1)        // primary definition of tier
    {
            SVCDependencyDescriptionEntryBox( );        // Mandatory Box
            SVCOperatingPointBox max_operating_point;   // mandatory
            SVCOperatingPointBox min_operating_point;
                            // conditionally optional, see above
            //Optional Boxes or fields may follow when defined later
            RectRegionBox( );                           // optional
            BufferingBox( );                            // optional
            TierDependencyBox( );                       // optional
            InitialParameterSetBox( );                  // optional
            IroiInfoBox( );                             // optional
            ProtectionSchemeInfoBox( );                 // optional
            TranscodingInfoBox( );                      // optional
    } else {
            unsigned int(8) primary_group_ID;
    }
}
```

In the above syntax, transcoding_process_id_count gives the number of entries in the following table. transcoding_process_id indicates the number of transcoding processes for which the transcoding process identifiers and the corresponding information of profile and level of the transcoded bitstreams are signaled. For each transcoding process, the transcoded bitstream is obtained by transcoding the bitstream of the representation of the current scalable tier according to the transcoding processes. The transcoding processes are specified as follows, although additional transcoding processes could also be added.

| trans_process_id | Transcoding Process |
|---|---|
| 0 | The first lightweight trancoding method discussed previously |
| 1 | The second lightweight trancoding method discussed previously, when the entropy coding method applied is the Context Adaptive Variable Length Coding (CAVLC) method, i.e., entropy_coding_mode_flag in the transcoded bitstream is equal to 0. |
| 2 | The second lightweight trancoding method discussed previously when the entropy coding method applied is the Context Adaptive Binary Arithmetic Coding (CABAC) method, i.e., entropy_coding_mode_flag in the transcoded bitstream is equal to 1. | trans_profileIndication contains the profile code of the transcoded bitstream. trans_profile_compatibility is a byte defined exactly the same as the byte which occurs between the profile_idc and level_idc in a sequence parameter set. trans_levelIndication contains the level code of the transcoded bitstream.

It should be noted that, in addition to the profile and level signaled above, other properties, including HRD/VBV parameters, bitrate information, frame rate information, initial parameter sets, may be similarly included in the TrancodingInfoBox( ).

The following is a discussion of SVC in the context of Session Description Protocol (SDP). A media type is specified together with an RTP payload format, usually in the same specification. A media type can be used with various protocols, such as HTTP and RTP, to identify the content carried within the protocols. The name of a media type comprises a content type and sub-type separated with a slash, e.g. "video/H.264-SVC". Any number of required and optional parameters can be specified for each media type to indicate the characteristics of the media in a more detailed level. According to the Internet Draft for SVC RTP payload format which is incorporated herein by reference in its entirety), the optional media parameter sprop-scalability-info may be used to convey a scalability information SEI message. The available media streams for an RTP-based session are usually described with the corresponding media type and its parameters that are included in a session description formatted according to the SDP. In unicast streaming applications, the session description is usually carried by the Real-Time Streaming Protocol (RTSP), which is used to set up and control the streaming session. In broadcast and multicast streaming applications, the session description may be carried as part of the electronic service guide (ESG) for the service. In video conferencing applications, the used codecs and their modes are negotiated during the session setup e.g. with the Session Initiation Protocol (SIP), which conveys messages formatted according to the SDP offer/answer model.

In an application example of multiparty video conferencing, the first sender includes a scalability information SEI message containing transcoding information as described above into a Session Description Protocol (SDP) file and delivers the SDP file e.g. using SIP to the MCU. The MCU then gets what IOP points are possible, either by bitstream extraction or transcoding. Therefore, the MCU can adapt the SVC bitstream from the first sender properly for all of the receivers. Alternatively, corresponding SDP fields can be defined to convey the transcoding identification and the property of the transcoded bitstreams.

Figure 4:
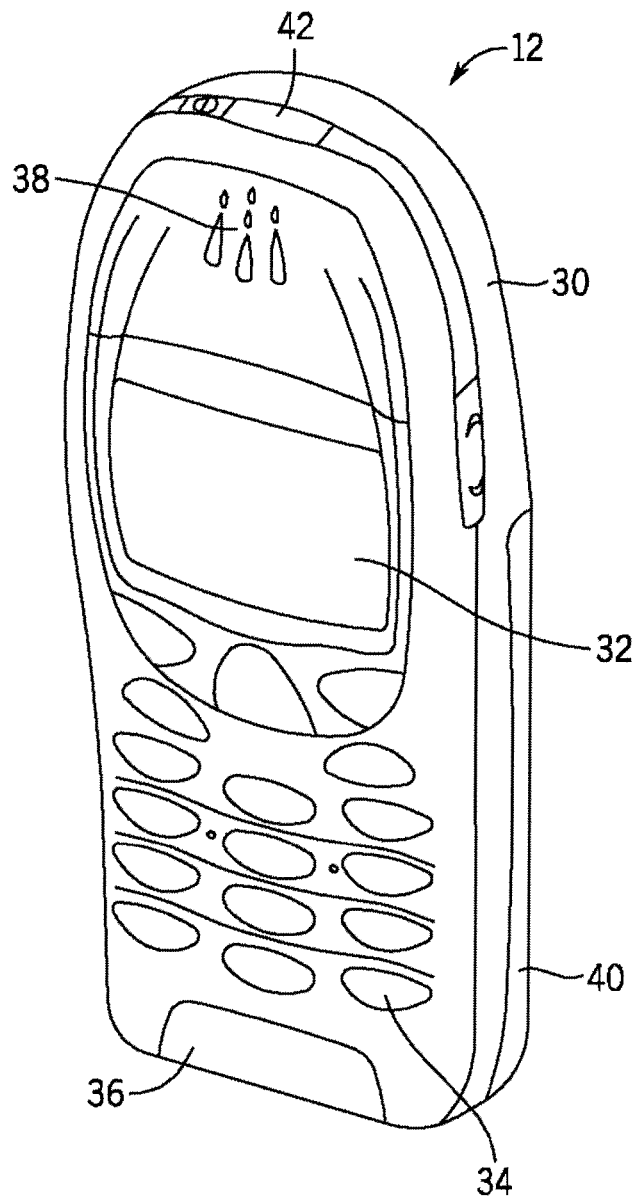
FIG. 4 is a perspective view of an electronic device that can be used in the implementation of the present invention.
Figure 5:
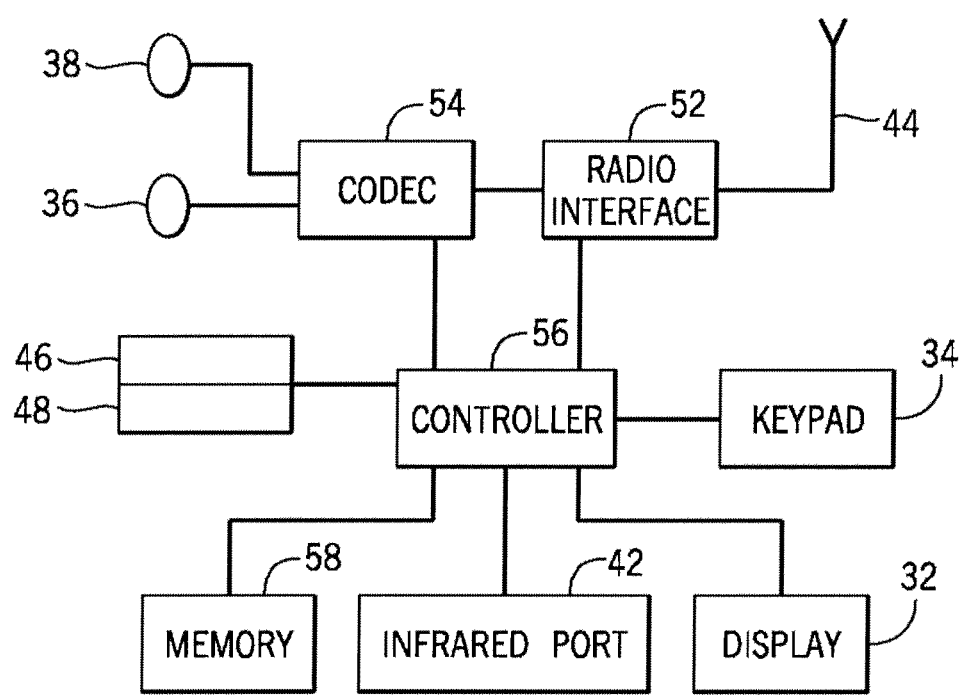
FIG. 5 is a schematic representation of the circuitry of the electronic device of FIG. 4.

FIGS. 4 and 5 show one representative electronic device 12 within which the present invention may be implemented. It should be understood, however, that the present invention is not intended to be limited to one particular type of electronic device 12 or other electronic device. The electronic device 12 of FIGS. 4 and 5 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56, a memory 58 and a battery 80. Individual circuits and elements are all of a type well known in the art, for example in the Nokia range of mobile telephones. These circuits and components can be incorporated into virtually all of the devices discussed herein, including an encoder, a converter and a decoder.

Communication devices of the present invention may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

The various embodiments described herein are described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devises including, but not limited to, Read Only Memory (ROM), Random Access Memory (RAM), compact discs (CDs), digital versatile disc (DVD), etc. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of various embodiments can be accomplished with standard programming techniques with rule based logic and other logic to accomplish the various database searching steps or processes, correlation steps or processes, comparison steps or processes and decision steps or processes. It should be noted that the words "component" and "module," as used herein and in the following claims, is intended to encompass implementations using one or more lines of software code, and/or hardware implementations, and/or equipment for receiving manual inputs.

The foregoing description of embodiments of the present invention has been presented for purposes of illustration and description. The foregoing description is not intended to be exhaustive or to limit embodiments of the present invention to the precise form disclosed, and modifications and variations are possible in light of the above teachings or may be acquired from practice of the present invention. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems and computer program products.

What is claimed is:

1. A method, comprising:
    encoding a video sequence into a scalable encoded bitstream comprising a plurality of layers, the scalable encoded bitstream comprising network abstraction layer (NAL) units, each NAL unit comprising a NAL unit header and a NAL unit payload; and
    providing a signaling corresponding to a scalable layer of the plurality of layers, the signaling including information identifying a transcoding process and a coding property, wherein the transcoding process, when applied to the scalable layer after encoding, modifies the NAL unit headers of the NAL units associated with the scalable layer, discards the NAL units associated with other scalable layers, and results in a non-scalable transcoded media stream, and wherein the coding property characterizes the transcoded media stream and comprises at least one of a coding format, a profile of a standard, a level of a standard, a hypothetical reference decoder parameter, and a video buffer verifier parameter.

2. The method of claim 1, further comprising providing the signaling within the scalable encoded bitstream.

3. The method of claim 1, further comprising providing the signaling within supplemental enhancement information.

4. The method of claim 1, further comprising providing the signaling within a file containing the scalable encoded bitstream.

5. The method of claim 1, further comprising providing the signaling via a transport protocol.

6. The method of claim 1, further comprising providing the signaling via a control protocol.

7. A non-transitory computer-readable medium storing computer code, that when executed, causes an apparatus to:
    encode a video sequence into a scalable encoded bitstream comprising a plurality of layers, the scalable encoded bitstream comprising network abstraction layer (NAL) units, each NAL unit comprising a NAL unit header and a NAL unit payload; and
    provide a signaling corresponding to a scalable layer of the plurality of layers, the signaling including information identifying a transcoding process and a coding property, wherein the transcoding process, when applied to the scalable layer after encoding, modifies the NAL unit headers of the NAL units associated with the scalable layer, discards the NAL units associated with other scalable layers, and results in a non-scalable transcoded media stream, and wherein the coding property characterizes the transcoded media stream and comprises at least one of a coding format, a profile of a standard, a level of a standard, a hypothetical reference decoder parameter, and a video buffer verifier parameter.

8. The non-transitory computer-readable medium of claim 7, wherein the computer code, when executed, causes the apparatus to:
provide the signaling within the scalable encoded bitstream.

9. The non-transitory computer-readable medium of claim 7, wherein the computer code, when executed, causes the apparatus to:
provide the signaling within supplemental enhancement information.

10. The non-transitory computer-readable medium of claim 7, wherein computer code, when executed, causes the apparatus to:
provide the signaling within a file containing the scalable encoded bitstream.

11. The non-transitory computer-readable medium of claim 7, wherein the computer code, when executed, causes the apparatus to:
provide the signaling via a transport protocol.

12. The non-transitory computer-readable medium of claim 7, wherein the computer code, when executed, causes the apparatus to:
provide the signaling via a control protocol.

13. An apparatus, comprising:
a processor; and
memory communicatively connected to the processor and storing computer code, that when executed, causes the apparatus to:
encode a video sequence into a scalable encoded bitstream comprising a plurality of layers, the scalable encoded bitstream comprising network abstraction layer (NAL) units, each NAL unit comprising a NAL unit header and a NAL unit payload; and
provide a signaling corresponding to a scalable layer of the plurality of layers, the signaling including information identifying a transcoding process and a coding property, wherein the transcoding process, when applied to the scalable layer after encoding, modifies the NAL unit headers of the NAL units associated with the scalable layer, discards the NAL units associated with other scalable layers, and results in a non-scalable transcoded media stream, and wherein the coding property characterizes the transcoded media stream and comprises at least one of a coding format, a profile of a standard, a level of a standard, a hypothetical reference decoder parameter, and a video buffer verifier parameter.

14. The apparatus of claim 13, wherein the computer code, when executed, causes the apparatus to:
provide the signaling within the scalable encoded bitstream.

15. The apparatus of claim 13, wherein the computer code, when executed, causes the apparatus to:
provide the signaling within supplemental enhancement information.

16. The apparatus of claim 13, wherein computer code, when executed, causes the apparatus to:
provide the signaling within a file containing the scalable encoded bitstream.

17. The apparatus of claim 13, wherein the computer code, when executed, causes the apparatus to:
provide the signaling via a transport protocol.

18. The apparatus of claim 13, wherein the computer code, when executed, causes the apparatus to:
provide the signaling via a control protocol.

19. A non-transitory computer-readable medium storing a data structure associated with a scalable encoded bitstream, said data structure comprising:
at least one syntax element associated with a transcoding process and a coding property characterizing a transcoded media stream resulting when the transcoding process is applied to one of a plurality of layers of the scalable encoded bitstream, the scalable encoded bitstream comprising network abstraction layer (NAL) units, each NAL unit comprising a NAL unit header and a NAL unit payload, wherein the transcoding process modifies the NAL unit headers of the NAL units associated with said one of the plurality of layers, discards the NAL units associated with other scalable layers of the plurality of layers, and results in a non-scalable transcoded media stream, and wherein the coding property comprises at least one of a coding format, a profile of a standard, a level of a standard, a hypothetical reference decoder parameter, and a video buffer verifier parameter.

20. The non-transitory computer-readable medium of claim 19, wherein the data structure further comprises the scalable encoded bitstream.

* * * * *